Jan. 13, 1970     E. J. HAYES     3,489,935
VEHICLE WHEEL INDUCTOR GENERATOR WITH ONE AIR GAP FILLED WITH LOW
RELUCTANCE MATERIAL
Filed Aug. 8, 1968
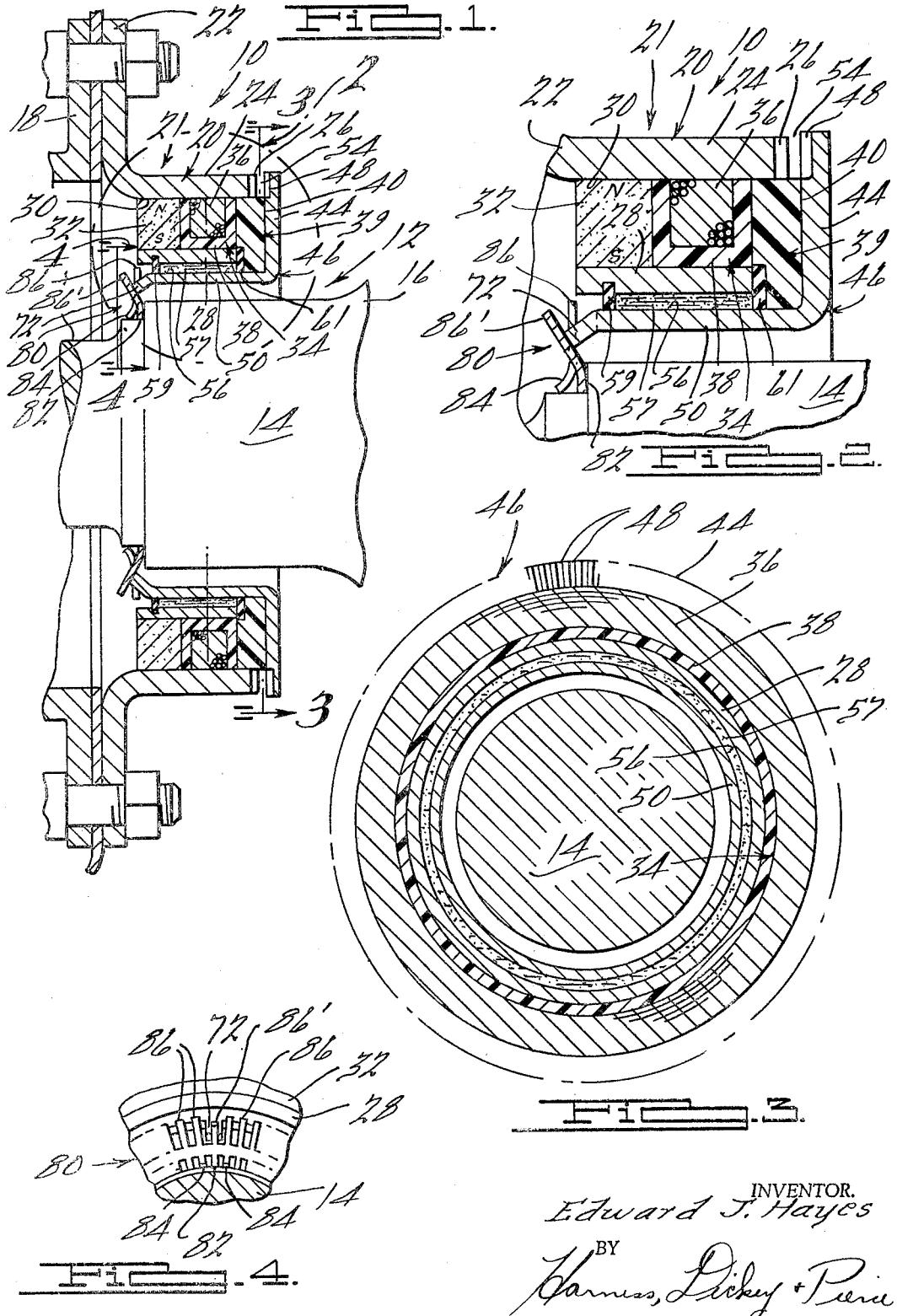
INVENTOR.
Edward J. Hayes
BY
Harness, Dickey + Pierce
ATTORNEYS.

United States Patent Office 3,489,935
Patented Jan. 13, 1970

3,489,935
VEHICLE WHEEL INDUCTOR GENERATOR WITH ONE AIR GAP FILLED WITH LOW RELUCTANCE MATERIAL
Edward J. Hayes, Ann Arbor, Mich., assignor to Kelsey-Hayes Company, Romulus, Mich., a corporation of Delaware
Filed Aug. 8, 1968, Ser. No. 751,228
Int. Cl. H02k 1/02, 1/28
U.S. Cl. 310—44                                   7 Claims

ABSTRACT OF THE DISCLOSURE

An inductor generator having an annular permanent magnet and output coil on a stator fixed to a vehicle axle housing, and having an outside rotor flexibly coupled to the axle. The reluctance in one air gap is varied by confronting rotor and stator teeth. The reluctance of a second air gap is reduced by being filled with powdered iron in oil or graphite. Flexible drive fingers between the axle and rotor permit axial and radial movement while maintaining the air gaps constant.

Summary background of the invention

The present invention relates to electrical speed sensors.

In sensing rotational speed, specifically for use in a skid control system for a vehicle, it is desirable to have a sensor which provides an output signal of high amplitude. A problem with sensors in the past has been the difficulty of minimizing the reluctance of the air gaps. In the present invention it is proposed to fill one of the gaps with powdered iron and a lubricant with the iron particles acting to reduce the reluctance of the path and with the lubricant minimizing friction losses.

Therefore, it is a general object of the present invention to provide an improved sensor construction for sensing relative rotation between two relatively rotating members.

It is another object of the present invention to provide a new and improved sensor construction of the above described type having a low reluctance air gap.

It is another object of the present invention to provide a sensor of the above described type having at least one gap filled with a low reluctance material.

It is another object of the present invention to provide a sensor of the above described type having at least one gap filled with iron particles and a lubricant whereby a low reluctance path is provided.

Other objects, features, and advantages of the present invention will become apparent from the subsequent description and the appended claims, taken in conjunction with the accompaying drawings, in which:

FIGURE 1 is an elevational view with some parts shown broken away and others in section of a sensor assembly embodying features of the present invention.

FIGURE 2 is a view to increased scale of that portion of the sensor of FIGURE 1 enclosed by the circle 2;

FIGURE 3 is a sectional view of the sensor assembly of FIGURE 1 taken generally along the lines 3—3; and FIGURE 4 is a sectional view of the sensor assembly of FIGURE 1 taken generally along the lines 4—4.

Looking now to the FIGURES 1 and 2 of the drawing, the sensor assembly is generally indicated by the numeral 10 and is shown in assembly relationship with a rear axle assembly 12 which rear axle assembly includes an axle shaft 14 which terminates at its outer end in a flange 16 to which a wheel assembly (not shown) can be mounted. The axle shaft 14 is rotatably mounted within an axle housing assembly 13 to which at least a portion of the sensor assembly 10 is mounted.

The sensor has a stator assembly 21 including stator or fixed pole member 20 which is secured to the axle housing 18 through a radially extending flange 22. The stator 20 has an axially extending annular portion 24 terminating in a plurality of generally uniformly circumferentially disposed, radially extending teeth 26. The axially extending portion 24 along with an annular ring 28 defines an annular cavity 30 in which are located a permanent magnet 32 and a coil assembly 34. The permanent magnet 32 is preferably of an annular ring construction having a polarity as indicated in FIGURE 1. The coil assembly 34 also extends annularly with the opening 30 and includes an electrical coil 36 which is wound in a plastic bobbin 38. An annular bearing ring 39 is located at the forward end of the cavity 30 and extends radially, inwardly beyond the radially inner surface of the ring 28. The bearing ring 39 can be constructed of a material having good bearing characteristics such as Teflon. The forward face 40 of the ring 39 extends beyond the axial extremity of the teeth 26 and also beyond the axial outer extremity of the ring 28 and engages a radially extending flange 44 of an armature or rotor member 46. The rotor or pole member 46 is generally of an L-shaped cross section and has a plurality of uniformly circumferentially disposed radially extending teeth 48 on flange 44 which are located in axial confrontation with the teeth 26. The armature 46 has an axially extending tubular portion 50 which extends for a substantial axial distance radially spaced from and in confrontation with ring 28. With the assembly as shown and described thus far a first air gap 54 is defined between the teeth 26 and 48 and a second gap 56 is defined between the tubular portion 50 of armature 46 and the ring 28. In order to provide a signal having a high amplitude it is desirable that the magnetic circuit for magnet 32 around coil 36 have a high reluctance when the teeth 26 and teeth 48 are out of alignment, i.e. tooth facing slot, and have a low reluctance when the teeth 26 and teeth 48 are in alignment, i.e. tooth facing tooth. In general the greater the change in flux to coil 36 (and hence the greater the change in reluctance of the circuit to the coil) the greater the amplitude of the output signal. With past constructions the gap in the return path, corresponding to gap 56, is air having a high reluctance. This reluctance is always present and limits the extent to which the total reluctance of the circuit can be reduced when the teeth 26 and teeth 48 are in alignment (low reluctance condition); this reluctance, however, has little effect when teeth 26 and 48 are out of alignment since the magnitude of the reluctance of gap 54 in this condition is sufficiently high to maintain the flux to coil 26 at a minimum. Hence it is desirable to provide the gap 56 to have a low reluctance in order to provide minimum reluctance when the teeth 26 and 48 are aligned thereby to maximize the change in flux (reluctance) and hence maximize the amplitude of the output signal.

In the present invention the gap 56 is sealed at opposite axial ends as by a pair of annular seals 59 and 61 and the gap 56 is filled with a fluid-like material 57 having a low reluctance; in a preferred from this material is a powdered iron in suspension with either a wet (oil) or dry (graphite) lubricant. The iron will substantially reduce the reluctance across the gap 56 while the lubricant minimizes friction. The result is a greater change in flux (and hence reluctance) to coil 26 and a signal of higher amplitude.

The armature 46 is provided with a plurality of generally axially extending finger portions 72. A drive ring 80 is made of a flexible material having a plurality of radially inwardly extending fingers 82 and 84 at its radially inner end which will grip the axle shaft 14 such that the rotation of the axle shaft 14 will result in rotation of the flexible drive ring 80. The drive member 80 also has a plurality of radially outwardly extending fingers 86 at its outer periphery. In assembly, armature finger portions 72 will engage spaced fingers 86′ of the fingers 86 depressing them radially inwardly as shown whereby a driving connection will be provided by two circumferentially, adjacent fingers 86; since the engagement between the drive member 80 and the armature 46 is by way of fingers 86 any relative axial and radial movement will be accommodated by flexing of the engaging ones of the fingers 84 whereby the widths of air gap 54 and gap 56 can be made constant.

Thus with the construction shown a high amplitude output signal can be obtained as a result of reduction of the reluctance of one of the gaps in the magnetic path to the sensing coil.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims

What is claimed is:

1. An electrical sensor for providing an electrical signal indicative of the rotational speed between a pair of relatively rotatable members, the sensor comprising: a rotor, a stator, pick-up coil means for providing an output signal in response to variations in a magnetic field, magnetic means for providing said magnetic field and including a magnetic path having a gap between said rotor and stator, a generally fluid-like material having a low reluctance located in said gap whereby that portion of said magnetic path across said gap has a low reluctance.

2. The sensor of claim 1 with said fluid-like material including particles of a low reluctance material in a lubricant.

3. The sensor of claim 1 with said fluid-like material including iron particles having a low reluctance in a lubricant.

4. The sensor of claim 3 with said lubricant being oil.

5. The sensor of claim 3 with said lubricant being graphite.

6. The sensor of claim 2 with said magnetic path including a second gap defined by a first set of teeth on said rotor in confrontation with a second set of teeth on said stator.

7. The sensor of claim 6 with said gap and said second gap extending annularly.

References Cited

UNITED STATES PATENTS

| | | | |
|---|---|---|---|
| 2,764,721 | 9/1956 | Johnson | 310—78 X |
| 3,193,713 | 7/1965 | Larson et al. | 310—168 |
| 3,291,056 | 12/1966 | Steinman | 310—90 X |

FOREIGN PATENTS

| | | |
|---|---|---|
| 606,117 | 10/1960 | Canada. |
| 1,336,035 | 7/1963 | France. |
| 1,088,106 | 10/1967 | Great Britain. |

WARREN E. RAY, Primary Examiner

U.S. Cl. X.R.

310—67, 75, 90, 168, 209

PO-1050
(5/69)

UNITED STATES PATENT OFFICE
CERTIFICATE OF CORRECTION

Patent No. 3,489,935                Dated January 13, 1970

Inventor(s) Edward J. Hayes

It is certified that error appears in the above-identified patent and that said Letters Patent are hereby corrected as shown below:

Column 1, line 53, delete "accompaying" and substitute therefor --accompanyi
Column 2, line 59, delete "from" and substitute therefor --form--

SIGNED AND
SEALED
SEP 15 1970

(SEAL)
Attest:

Edward M. Fletcher, Jr.
Attesting Officer

WILLIAM E. SCHUYLER, JR.
Commissioner of Patents